I. McCOON.
TRUCK.
APPLICATION FILED APR. 16, 1913.
1,103,796.
Patented July 14, 1914.
2 SHEETS—SHEET 1.
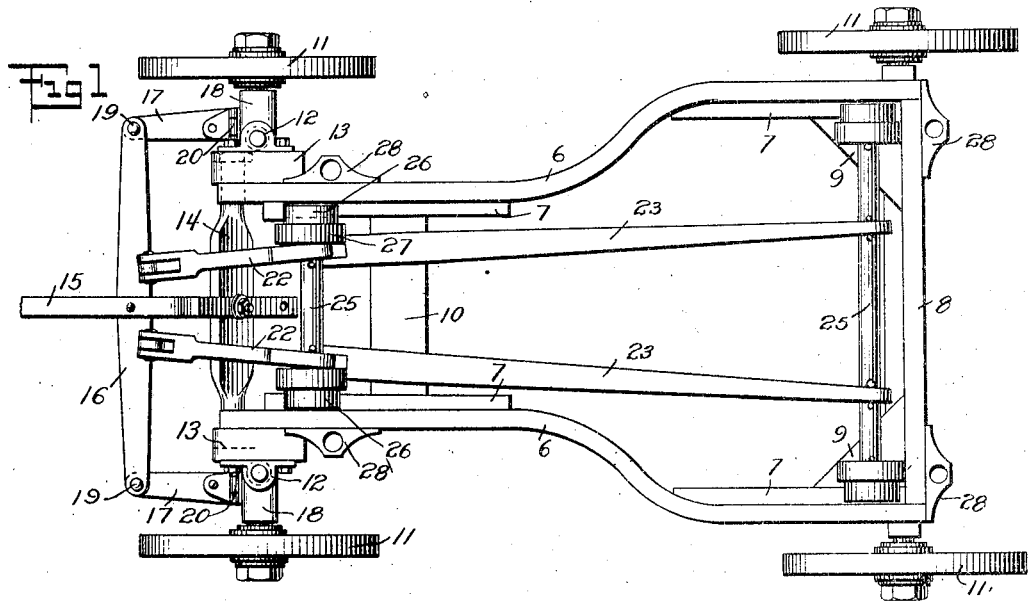
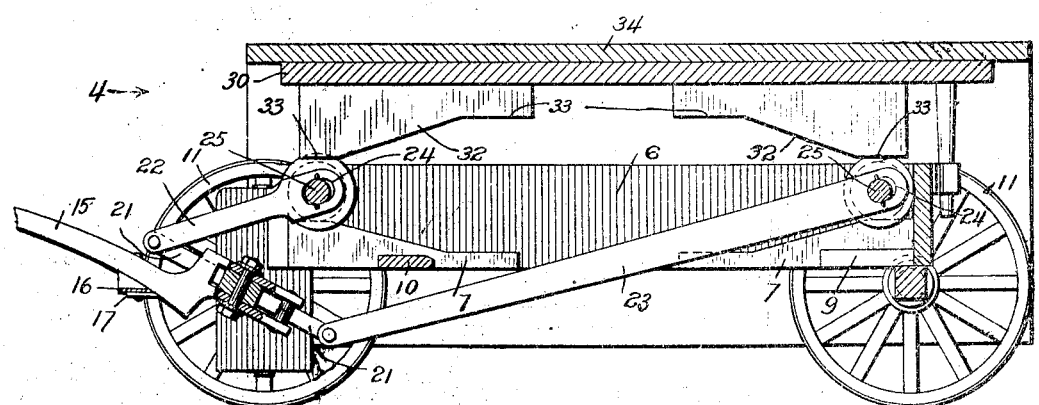
WITNESSES
C. J. Hachenberg
B. Joffe
INVENTOR
Ira McCoon
BY Munn & Co
ATTORNEYS I. McCOON.
TRUCK.
APPLICATION FILED APR. 16, 1913.
1,103,796.
Patented July 14, 1914.
2 SHEETS—SHEET 2.
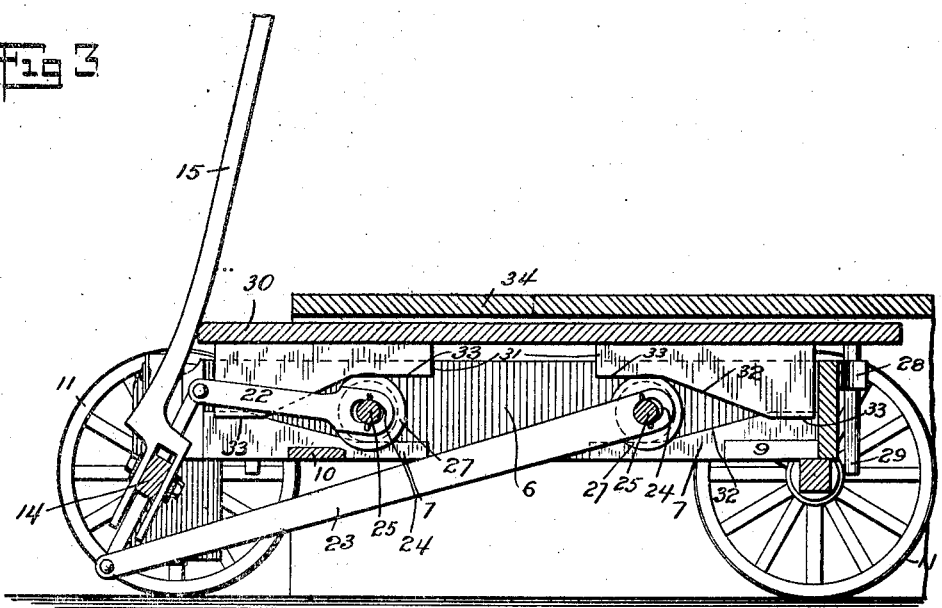
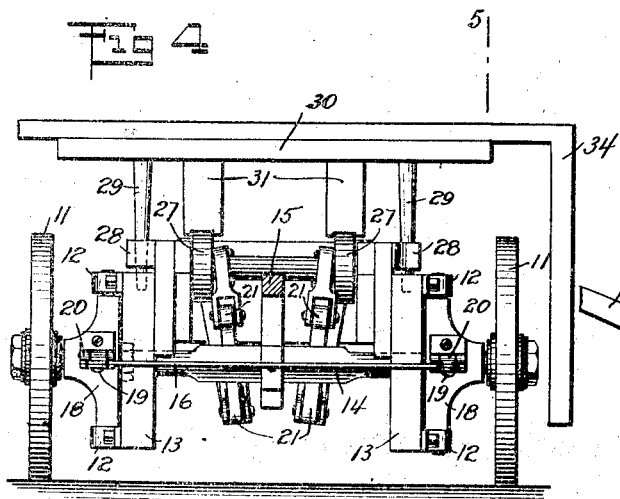
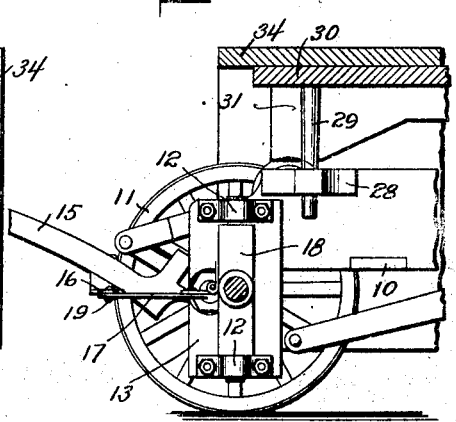
WITNESSES
INVENTOR
Ira McCoon
BY
ATTORNEYS

UNITED STATES PATENT OFFICE.

IRA McCOON, OF WINDSOR LOCKS, CONNECTICUT.

TRUCK.

1,103,796. Specification of Letters Patent. Patented July 14, 1914.

Application filed April 16, 1913. Serial No. 761,502.

*To all whom it may concern:*

Be it known that I, IRA McCOON, a citizen of the United States, and a resident of Windsor Locks, in the county of Hartford and State of Connecticut, have invented a new and improved Truck, of which the following is a full, clear, and exact description.

My invention relates to manually-operated trucks; and has reference more particularly to the platform of the same, which is adapted to move vertically on the frame of the truck.

An object of the invention is to provide a manually operated truck by means of which the time and expense involved to load the truck is reduced to a minimum.

Another object of the invention is to provide a manually operated truck in which the platform for loads is made to move bodily.

A still further object of the invention is to provide a truck in which the platform can be maintained in its extreme positions without any effort.

The invention consists of the construction and combination of parts to be more fully described hereinafter and fully set forth in the claims.

Reference is to be had to the accompanying drawings forming a part of this specification, in which like characters indicate corresponding parts in all the views and in which:

Figure 1 is a plan view of an embodiment of my invention with the platform for loads removed from same; Fig. 2 is a longitudinal section, showing the platform in its raised position supporting a loader; Fig. 3 is a similar section showing the platform in its lowermost position with the loader resting on the ground. Fig. 4 is an end view on Fig. 2, as indicated by the arrow; and Fig. 5 is a section on line 5—5, Fig. 4.

In the appended drawings, 6 represents the side members of the frame of the truck, each provided with cams or guide portions 7 disposed near the ends of the members. Rigidly connected to the rear ends of the members 6 is a transverse bar 8, and reinforcing this connection are corners 9. The forward ends of the members 6 are properly spaced by means of a transverse bar 10 rigidly secured to the under side of same substantially near the middle of the forward guide portions 7. The frame of the truck, formed by the members 6, 8 and 10, is mounted on wheels 11, the forward pair of which is pivotally mounted in bearings 12 secured to vertical blocks 13, each in turn secured to the forward end of the exterior side of the member 6.

Pivotally mounted in and between the blocks 13 is a member 14 to which is centrally and pivotally attached a tongue 15. Pivotally and centrally secured to the tongue 15, and substantially parallel to the member 14, is a beam 16, both ends of which are pivotally attached to arms 17. The opposite end of each arm 17 is hinged to a wheel carrier 18, which is pivotally mounted in the bearings 12. The axis of pivot 19 connecting each of the arms 17 and the beams 16 is normal to the axis of the hinge 20 which connects the arms 17 to the wheel carrier 18.

The member 14 is provided on each side of the tongue 15 with arms 21 disposed on the opposite sides of the member 14 and of equal length, the oppositely disposed arms 21 being substantially in alinement and parallel with the direction of the tongue. Pivotally connected with one end of the extremities of the arms 21, pointing toward the free end of the tongue, are connecting rods 22; and similarly pivotally connected to the opposite arms 21 are connecting rods 23. The opposite ends of the connecting rods 22 and 23 are provided with an opening 24, the oppositely disposed openings 24 of rods 22 and 23 respectively being engaged by a shaft 25 disposed transversely between the members 6. Mounted on the ends of each of the shafts 25 are two separate rollers 26 and 27, the roller 26 resting on the guide portions 7, and of smaller diameter than the roller 27. The shafts 25 are provided with means to prevent a lateral displacement of the rollers 26 and 27 and also of the connecting rods 22 and 23.

The frame of the truck is provided with guiding blocks 28 engaged by pins 29 secured to the under side of the platform 30. The under side of the platform 30 is provided with cams or guiding means 31 each resting on a roller 27. The guide members 7 and the guiding means 31 are each provided with an inclined portion 32 and straight portions 33, so that each of the inclined portions is intermediate the straight portions. The inclined portions 32 of the oppositely disposed guiding members 31 and 7 converge toward the adjacent ends of the frame.

When the tongue 15 is in the position indicated in Fig. 3 and is caused to move to the position indicated in Fig. 2 the connecting arms 22 and 23 will be caused to move in opposite directions, carrying with them the shafts 25. The translation of the shafts 25 will cause the roller 26 resting on the straight portion 33 to rise on the inclined portion 32 of the guide members 7. Similarly, due to the translation of the shaft 25, the roller 27 will rotate in the opposite direction from the roller 26; coming in contact with the incline 32 of the guiding means 31 they will cause the platform 30 to rise. Therefore, the rising of the platform is accelerated by the total action of the rollers 26 and 27 and the inclines 32 of the respective guide portions 7 and 31. When each pair of adjacent rollers 26 and 27 has passed the incline 32 of the guide members 7 and 31 in contact with them, it enters on to the straight portions 33, as shown in Fig. 2. When the rollers 26 and 27 are contacting with the straight portions 33 of the respective guide members there is no tendency for the rollers to displace themselves, as the horizontal displacement of the platform proper on the frame is prevented by the engagement of the pins 29 with the blocks 28.

The use of my truck can be as follows: Preferably loaders 34 are provided in the shape of a trough wide enough to admit the truck. One of the said loaders resting on the ground, as shown in the drawing, can then be loaded. The truck is then backed up into the loader, with the platform as shown in Fig. 3, and, consequently, with the tongue in position shown in same figure, until the major part of the platform is properly in the loader 34. The tongue 15 is then made to rotate with the member 14, causing the movement of the connecting rods 22 and 23, as before described, and, consequently, forcing the platform against the loader and raising the same from the ground to the position shown in Figs. 2 and 4. By pulling on the tongue 15, the truck with the loader on it is then carried to the desired place where the same is placed on the ground by reversing the operation above described. In place of the removed loader, another can be put in position while the first loader is carried to its destination to be unloaded.

It can be easily seen from Fig. 1 that when the tongue is in position indicated in Figs. 1 and 5, the front wheels 11 can be caused to swing by medium of the beam 16 on the arms 17 to direct the truck. It must be remarked that the truck can be used with same efficiency for any load where the same could be engaged by the platform, as described.

From the above description it can be seen that with my truck the time necessary for charging and discharging a load on the platform is reduced to a minimum; and the load proper is not very much disturbed during the loading of it on the truck, as the platform is caused to move bodily substantially parallel to the frame. Furthermore, while my truck as here disclosed is principally for manual operation, same can be easily used with animal power.

Having thus described my invention, what I claim as new and desire to secure by Letters Patent is:—

1. In a truck,—a frame having cam surfaces; a pair of rear wheels and a pair of front wheels for said frame, said front pair of wheels being pivotally attached to said frame; a tongue adapted to oscillate vertically and transversely; a beam pivotally mounted on said tongue; arms pivotally connected to said beam and said pivotally mounted pair of wheels; a platform for loads having cam surfaces associated with said frame; rollers engaging the cam surfaces of the platform and frame; means connecting the rollers to said tongue whereby when said tongue is oscillated vertically the platform is made to reciprocate to and from said frame by the rollers moving on said cam surfaces.

2. In a truck,—a frame comprising two oppositely disposed longitudinal members; cams adjacent the ends of said members and integral therewith; pairs of front and rear wheels associated with said frame, said front pair of wheels being pivotally attached to said frame; a tongue adapted to oscillate vertically and transversely of said frame; a beam pivotally mounted on said torgue; arms pivotally connected to said beam and said pivotally mounted pair of wheels; transverse shafts in the frame between said longitudinal members; a pair of independent rollers on each end of said shaft, one of each of said pair of rollers engaging one of said cams; levers, connecting the tongue to the shafts; a platform for loads associated with the frame; cams carried by said platform and integral therewith, each of said cams on said platform engaging the second of each of said pairs of rollers; and means on said platform and frame, for guiding said platform vertically.

3. In a truck,—a frame having cam surfaces; a pair of rear wheels and a pair of front wheels for said frame, said front wheels being pivotally attached to said frame; a tongue adapted to oscillate vertically and transversely of said frame; a beam pivotally mounted on said tongue; arms pivotally connected to said beam and said pivotally mounted front wheels; a platform for loads, having cam surfaces; rollers engaging the cam surfaces of the platform and frame; means connecting the rollers to said tongue whereby when said tongue is oscillated vertically the platform is made to reciprocate to and from said frame by the rolling action of the rollers on the cam surfaces, said tongue when oscillated transversely of the frame causing the movement of the front wheels on their pivots whereby the truck is directed.

4. In a truck,—a frame having cam surfaces; a pair of rear wheels and a pair of front wheels for said frame; means securing each front wheel pivotally to the frame; a transverse, rotatably mounted member at the front of the frame; a tongue pivotally mounted on said member whereby said tongue is adapted to oscillate transversely of said frame on said member and vertically to the frame with said member; a beam pivotally mounted on said tongue; arms pivotally connected to said beam and said pivotally mounted wheels; a platform for loads, having cam surfaces; rollers engaging the cam surfaces of the platform and frame, said transverse, rotatably mounted member having arms; levers connecting the rollers to the arms of said transverse member whereby when said tongue is oscillated vertically the platform is made to reciprocate to and from said frame by the rolling action of the rollers on the cam surfaces of the frame and the platform, said tongue when oscillating transversely on said transverse, rotatably mounted member causing the movement of the front wheels on their pivotal means substantially as and for the purpose set forth.

In testimony whereof I have signed my name to this specification in the presence of two subscribing witnesses.

IRA McCOON.

Witnesses:
 CLINTON H. POMEROY,
 L. D. CUTLER.